United States Patent [19]

Stromswold

[11] Patent Number: 4,926,940
[45] Date of Patent: May 22, 1990

[54] METHOD FOR MONITORING THE HYDRAULIC FRACTURING OF A SUBSURFACE FORMATION

[75] Inventor: David C. Stromswold, Addison, Tex.

[73] Assignee: Mobil Oil Corporation, New York, N.Y.

[21] Appl. No.: 240,308

[22] Filed: Sep. 6, 1988

[51] Int. Cl.$^5$ .................. E21B 43/267; E21B 49/00
[52] U.S. Cl. ................................ 166/247; 73/152; 166/250; 166/280
[58] Field of Search ............... 166/280, 308, 250, 254, 166/255, 247; 250/259, 270; 73/151, 152

[56] References Cited

U.S. PATENT DOCUMENTS

| | | | |
|---|---|---|---|
| 2,869,642 | 1/1959 | McKay et al. | 166/250 |
| 2,951,535 | 9/1960 | Mihram et al. | 166/280 X |
| 3,035,174 | 5/1962 | Turner et al. | 250/83.3 |
| 3,503,447 | 3/1970 | Hamby, Jr. | 166/285 X |
| 3,513,100 | 5/1970 | Stogner | 166/285 X |
| 3,642,068 | 2/1972 | Fitch et al. | 166/307 |
| 3,796,883 | 3/1974 | Smith et al. | 166/250 X |
| 3,965,982 | 6/1976 | Medlin | 166/249 |
| 3,987,850 | 10/1976 | Fitch | 166/280 X |
| 4,067,389 | 1/1978 | Savins | 166/246 |
| 4,109,721 | 8/1978 | Slusser | 166/280 |
| 4,378,845 | 4/1983 | Medlin et al. | 166/297 |
| 4,467,642 | 8/1984 | Givens | 250/270 X |
| 4,515,214 | 5/1985 | Fitch et al. | 166/250 |
| 4,549,608 | 10/1985 | Stowe et al. | 166/280 |
| 4,568,830 | 2/1986 | Stromswold et al. | 250/261 |
| 4,685,519 | 8/1987 | Stowe et al. | 166/278 |
| 4,687,061 | 8/1987 | Uhri | 166/308 |
| 4,714,115 | 12/1987 | Uhri | 166/308 |

Primary Examiner—Stephen J. Novosad
Attorney, Agent, or Firm—Alexander J. McKillop; Charles J. Speciale; George W. Hager, Jr.

[57] ABSTRACT

A method for monitoring the hydraulic fracturing of a subsurface formation. The formation is fractured with a fracturing fluid or a proppant containing a characteristic element of the formation which emits delayed gamma rays when activated with neutrons. The formation is activation logged before and after such fracturing. The difference in the logs is a measure of the extent of travel of the fracturing fluid or extent of deposition of the proppant within the fractured formation.

12 Claims, 1 Drawing Sheet

U.S. Patent May 22, 1990 4,926,940
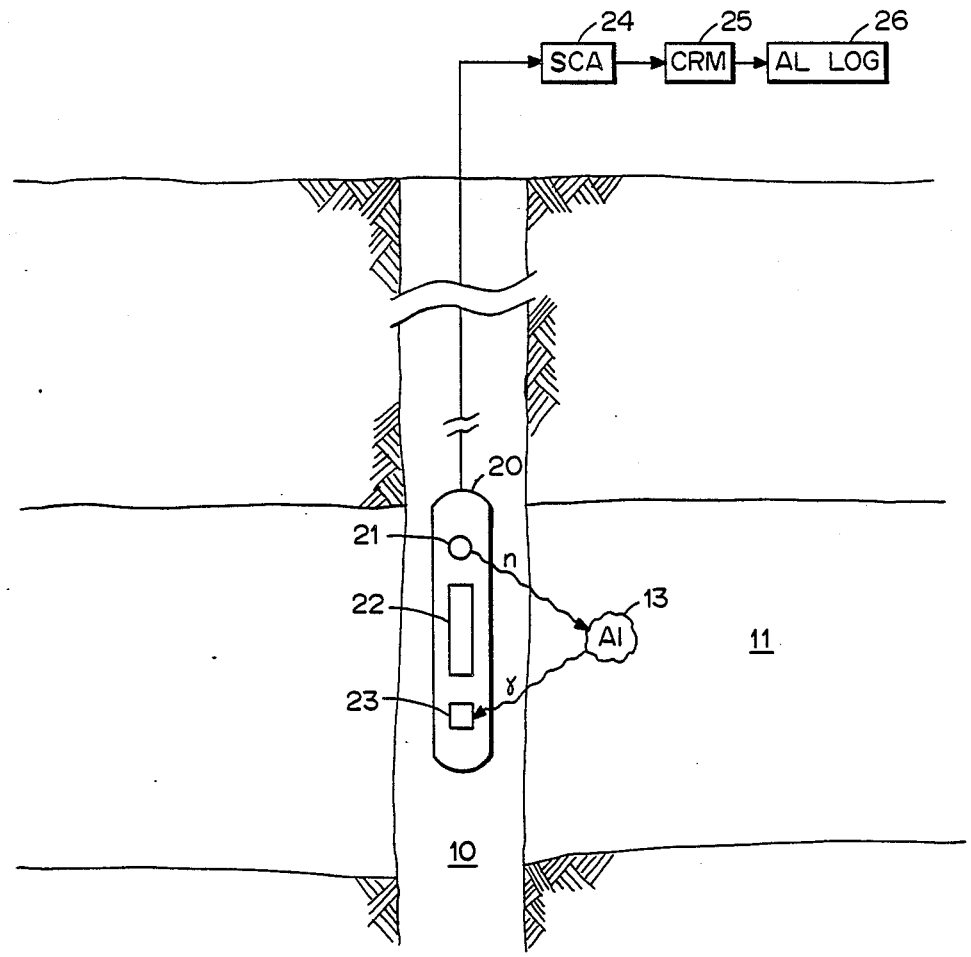

METHOD FOR MONITORING THE HYDRAULIC FRACTURING OF A SUBSURFACE FORMATION

BACKGROUND OF THE INVENTION

This invention relates to monitoring the hydraulic fracturing of a subsurface formation and more particularly to the use of an aluminum activation log for measuring the extent of such hydraulic fracturing operation.

In the completion of wells drilled into the earth, a string of casing is normally run into the well and a cement slurry is flowed into the annulus between the casing string and the wall of the well. The cement slurry is allowed to set and form a cement sheath which bonds the string of casing to the wall of the well. Perforations are provided through the casing and cement sheath adjacent the subsurface formation. Fluids, such as oil or gas, are produced through these perforations into the well.

It is oftentimes desirable to treat subterranean formations in order to increase the permeability thereof. For example, in the oil industry it is conventional to hydraulically fracture a well in order to produce one or more fractures in the surrounding formation and thus facilitate the flow of oil and/or gas into the well or the injection of fluids such as gas or water from the well into the formation. Such hydraulic fracturing is accomplished by disposing a suitable fracturing fluid within the well opposite the formation to be treated. Thereafter, sufficient pressure is applied to the fracturing fluid in order to cause the formation to break down with the attendant formation of one or more fractures therein. Simultaneously with or subsequent to the formation of the fracture a suitable carrier fluid having suspended therein a propping agent or proppant such as sand or other particulate material is introduced into the fracture. The proppant is deposited in the fracture and functions to hold the fracture open after the fluid pressure is released. Typically, the fluid containing the proppant is of a relatively high viscosity in order to reduce the tendency of the propping agent to settle out of the fluid as it is injected down the well and into the fracture.

Several such hydraulic fracturing methods are disclosed in U.S. Pat. Nos. 3,965,982; 4,067,389; 4,378,845; 4,515,214; 4,549,608 and 4,685,519, for example.

The extent of such formation hydraulic fracturing and the location of proppant materials has been ascertained by the use of radioactive tracers as described in U.S. Pat. No. 3,987,850 to J. L. Fitch. Such radioactive tracers have been plated or coated on propping agents and injected along with the fracturing fluid. These coatings have contained radioactive isotopes such as Au-198, Ag-110, Ir-192, and Sc-46 with half-lives from about 2 to 250 days.

In U.S. Pat. No. 3,796,883 the effectiveness and competency of a well gravelpack and changes therein are determined by monitoring the location of radioactive pellets within the gravel pack.

The use of such radioactive tracers or coatings has, however, presented monitoring, logistical and environmental problems. The short half-lives of such tracers prevent the monitoring of the movement of such tracers in the formation fractures other than over a short time interval. Transportation and use of radioisotopes is expensive and government regulations or restrictions must be accommodated. Disposal of excess radioactive proppants can be a problem, especially in offshore operations.

It is therefore a specific object of the present invention to provide a method for hydraulic fracturing in which the extent of such fracturing is measured without the use of radioactive isotope tracers.

SUMMARY OF THE INVENTION

In accordance with the present invention there is provided a method for monitoring a hydraulic fracturing operation. A subsurface formation to be fractured hydraulically is first logged to provide a measurement of delayed gamma rays from the neutron activation of a characteristic element of the formation, such as aluminum for example. The formation is then hydraulically fractured by the injection of a fracturing fluid. A proppant may also be injected. Either the fracturing fluid or the proppant may contain amounts of such characteristic element. Thereafter, the formation is again logged to provide a measurement of delayed gamma rays from the neutron activation of the formation after fracturing with the characteristic element containing fracturing fluid or proppant. The difference between the delayed gamma ray measurements before and after such fracturing identifies the extent of travel of the fracturing fluid or the extent of deposition of the proppant within the fractured formation. By running additional logs over select time intervals, the movement of the proppant may be monitored.

BRIEF DESCRIPTION OF THE DRAWING

The sole FIGURE of the drawing illustrates an aluminum activation logging system useful in monitoring a hydraulic fracturing operation of a subsurface formation in accordance with the present invention.

DESCRIPTION OF THE PREFERRED EMBODIMENT

Referring to the FIGURE, a borehole 10 penetrates a subsurface formation of interest 11 which is to be hydraulically fractured to facilitate the flow of oil and/or gas from the formation 11 into the borehole. Before such fracturing takes place, the formation 11 is irradiated with neutrons to activate a characteristic element of the formation, such as aluminum, to produce delayed gamma rays. These delayed gamma rays are measured as an indication of the "background" amount of such element in the formation prior to fracturing.

More particularly, a logging tool 20 is lowered into the borehole 10 to a position adjacent the bottom of formation 11. Logging tool 20 includes a neutron source 21, preferably a Californium-252 source, a neutron shield 22 and a gamma ray detector 23, such as a NaI scintillation detector such as shown in U.S. Pat. No. 4,467,642 to Givens, or more preferably a bismuth germanate detector as shown in U.S. Pat. No. 4,568,830 to Stromswold and Givens, the teachings of which are incorporated herein by reference. Such tool 20 is raised so as to traverse the formation 11 from bottom to top. During such traversal the neutron source 21 irradiates the formation 11 with neutrons n, preferably having an average energy of about 2.348 MeV for aluminum activation logging. This energy is sufficiently low to produce delayed gamma radiation $\gamma$ of 1.78 MeV from the activation of the aluminum content within formation 11 as indicated at 13 in FIG. 1. The spacing between the neutron source 20 and the gamma ray detector 23 is selected to yield maximum response by the gamma ray detector 23 to the delayed gamma rays from aluminum at an acceptable logging speed. A particularly suitable spacing is in the order of 5 to 8 feet.

The gamma radiation measurement from detector 23 is applied uphole to a single channel analyzer 24 which is biased to pass to a count rate meter 25 only those measurements that are in an energy window that maximizes the count of 1.78 MEV aluminum gamma rays. The count rate from count rate meter 25 is recorded as an aluminum activation log on the recorder 26 as a measure of the formation aluminum background content with depth in the formation 11. For further description of aluminum activation logging, reference may be made to U.S. Pat. No. 4,467,642 to Givens.

Having completed the initial step of logging the formation of interest for an elemental background content, such as aluminum, the formation is then hydraulically fractured in accordance with the teachings of any of the aforementioned U.S. Pat. Nos. 3,965,982; 4,067,389; 4,378,845; 4,515,214; 4,549,608; and 4,685,519, the teachings of which are incorporated herein by reference.

Following the hydraulic fracturing of the formation it is often desirable to identify the success of the fracturing operation. This may be accomplished in accordance with the present invention by including as an element of the fracturing fluid or the proppant the same characteristic element activated within the formation prior to the fracturing operation, such as the element aluminum. Thereafter the formation 11 is again logged with the logging tool 20 to provide a second neutron activation log of the formation following fracturing. This second neutron activation log is a record of the measurement of delayed gamma rays of both the aluminum background of the formation as measured before fracturing and the aluminum content of the fracturing fluid or the proppant. The difference between these two neutron activation logs is then determined as a measure of the aluminum content of the fracturing fluid or of the proppant. This measure of aluminum content in either the fracturing fluid or proppant identifies the extent of the fracture in the formation or the extent of deposition of the proppant within the fractured formation. Numerous aluminum containing proppants are available throughout the industry. These proppants typically contain corundum and mullite which are forms of aluminum oxide.

As noted above, the characteristic element to be activated may be dissolved in the fracturing fluid. However, in another embodiment, this element may be contained only in a proppant which is injected into the formation either simultaneously with the fracturing fluid or subsequently to the fracturing fluid. One advantage of including the element with the proppant is that additional neutron activation logs may be run over various time intervals to detect movement of the proppant with time in the fractured formation.

Having now described the present invention with respect to the foregoing embodiments, it is to be understood that various modifications may be made without departing from the spirit and scope of the invention as set forth in the appended claims.

What is claimed is:

1. A method for monitoring the hydraulic fracturing of a subsurface formation of interest, comprising the steps of:
   (a) logging a subsurface formation through a measurement of delayed gamma rays from the neutron activation of a characteristic element of said formation,
   (b) injecting a fracturing fluid into said formation to hydraulically create a fracture within said formation,
   (c) injecting a proppant into said fracture containing said element which emits delayed gamma rays in response to neutron activation,
   (d) logging said proppant containing said fractured formation through a measurement of delayed gamma rays from the neutron activation of said proppant containing fractured formation, and
   (e) identifying the extent of proppant deposition within said fractured formation from the difference in the delayed gamma ray measurements of said formation before and after said proppant injection.

2. The method of claim 1 wherein said steps of fracturing said formation and injecting said proppant into said fracture are carried out simultaneously.

3. A method for monitoring the hydraulic fracturing of a subsurface formation of interest, comprising the steps of:
   (a) identifying the aluminum content of a subsurface formation through a measurement of delayed gamma rays from the neutron activation of said aluminum,
   (b) injecting a fracturing fluid into said formation to hydraulically create a fracture in said formation,
   (c) injecting an aluminum containing proppant into said fracture,
   (d) identifying the aluminum content of said formation following said aluminum containing proppant injection through a measurement of delayed gamma rays from the neutron activation of said aluminum containing proppant, and
   (e) identifying the location of said proppant within said fracture from the difference in the aluminum contents of said formation before and after said aluminum containing proppant injection.

4. The method of claim 3 wherein said steps of logging said formation for aluminum content before and after proppant injection comprise the steps of:
   (a) irradiating said formation with neutrons of sufficient energy to produce delayed gamma rays of about 1.78 MeV from the activation of the aluminum content of said formation, and
   (b) measuring said delayed gamma rays within an energy window to maximize the count of 1.78 MeV gamma rays.

5. A method for monitoring the hydraulic fracturing of a subsurface formation of interest, comprising the steps of:
   (a) logging a subsurface formation through a measurement of delayed gamma rays from the neutron activation of a characteristic element of said formation,
   (b) hydraulically fracturing said formation by injecting a fracturing fluid into said formation containing said element which emits delayed gamma rays upon neutron activation,
   (c) logging the fractured formation through a measurement of delayed gamma rays from the neutron activation of said fractured formation, and
   (d) identifying the extent of a fracture created by the injection of fracturing fluid into said formation from the difference in measured delayed gamma rays before and after fracturing.

6. The method of claim 5 wherein said delayed gamma ray emitting element is dissolved in said fracturing fluid.

7. The method of claim 6 wherein said delayed gamma ray emitting element includes aluminum.

8. The method of claim 6 wherein said delayed gamma ray emitting element is in the form of a proppant.

9. The method of claim 8 wherein said proppant includes an aluminum oxide.

10. A method for monitoring the hydraulic fracturing of a subsurface formation of interest, comprising the steps of:
   (a) irradiating a formation with neutrons of sufficient energy to produce delayed gamma rays from the activation of the aluminum content within said formation;
   (b) measuring said delayed gamma rays,
   (c) hydraulically fracturing said formation to create a fracture in communication with said well,
   (d) injecting an aluminum oxide containing proppant into said fracture,
   (e) irradiating said fractured formation with neutrons of sufficient energy to produce delayed gamma rays from the activation of the aluminum content of said proppant containing formation, and
   (f) identifying the extent of deposition of said proppant within said fracture from the difference in the measured gamma rays before and after the injection of said proppant.

11. The method of claim 10 wherein steps (c) and (d) are carried out simultaneously.

12. The method of claim 10 further comprising the steps of:
   (a) repeating step (e) after a time interval, and
   (b) identifying the extent of movement of said proppant within said fracture during said time interval from the difference in the delayed gamma ray measurements of said proppant containing formation before and after said time interval.

* * * * *